United States Patent
Desai et al.

(10) Patent No.: US 10,831,211 B1
(45) Date of Patent: Nov. 10, 2020

(54) MARKER BASED NAVIGATION SYSTEM FOR ROBOTIC VEHICLE

(71) Applicant: United Services Automobile Association (USAA), San Antonio, TX (US)

(72) Inventors: Snehal Desai, Richardson, TX (US); Matthew Flachsbart, Grapevine, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/005,196

(22) Filed: Jun. 11, 2018

(51) Int. Cl.
 *G05D 1/00* (2006.01)
 *G05D 1/02* (2020.01)

(52) U.S. Cl.
 CPC ......... *G05D 1/0234* (2013.01); *G05D 1/0246* (2013.01); *G05D 1/0274* (2013.01)

(58) Field of Classification Search
 CPC .. G05D 1/0088; G05D 1/0246; G05D 1/0274; G05D 1/0234
 See application file for complete search history.

(56) References Cited

U.S. PATENT DOCUMENTS

| | | | |
|---|---|---|---|
| 8,239,083 B2 * | 8/2012 | Durkos | G05D 1/0219 700/245 |
| 9,630,319 B2 * | 4/2017 | Vicenti | B25J 9/163 |
| 2017/0031369 A1 * | 2/2017 | Liu | G05D 1/102 |
| 2018/0107969 A1 * | 4/2018 | Trivelpiece | G06Q 10/08 |

* cited by examiner

*Primary Examiner* — Anshul Sood
(74) *Attorney, Agent, or Firm* — BakerHostetler

(57) ABSTRACT

Methods and apparatus for operating a robotic vehicle. A sensor is positioned on the robotic vehicle to identify a first marker positioned in a first area within a space defined by a structure. Data is received from the sensor descriptive of one or more characteristics of the marker. A first instruction is identified corresponding to the one or more characteristics. The robotic vehicle is caused to change a physical orientation characteristic of the first marker and move to a second area within the space.

21 Claims, 4 Drawing Sheets

MARKER BASED NAVIGATION SYSTEM FOR ROBOTIC VEHICLE

BACKGROUND OF THE INVENTION

The use of robotic vehicles continues to grow as do the use cases for such vehicles. For example, robotic vehicles are used in warehouses to manage inventory by retrieving, positioning, and moving items. Robotic vehicles are used as pool cleaners and vacuum cleaners. Unmanned aerial vehicles have been provided with robotic functionality and are now being used for a number of tasks, such as property inspection and mapping.

A problem exists, however, in that these robotic vehicles are not always efficient in their movements as they perform a task. Robotic vacuum cleaners and pool cleaners often trace erratic patterns that cause them to miss dirty spots. Robotic aerial vehicles run into walls or hit objects. Such mishaps make it desirable to provide some measure by which a user can control the route of an unmanned robotic vehicle while maintaining its robotic character. That is, it would be desirable for a user to be able to influence the route that a robotic vehicle without taking over full control of the device. Accordingly, what is needed are marker based navigation systems for robotic vehicles.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

In one embodiment, a method for operating a robotic vehicle is provided. A sensor positioned on the robotic vehicle is utilized to identify a first marker positioned in a first area within a space defined by a structure. Data is received from the sensor descriptive of one or more characteristics of the marker. At least one instruction is identified corresponding to the one or more characteristics. The robotic vehicle is caused to perform one or more actions in response to the instruction.

In one embodiment, the robotic vehicle is caused to perform one or more actions comprising causing the robotic vehicle to move to a second area within the space. In one embodiment, the sensor is utilized to identify a second marker positioned in a second area within the space. In one embodiment, the robotic vehicle is caused to move to a third area within the space. In one embodiment, the first marker is a sign. In one embodiment, the one or more characteristics include at least one of a size of the sign, a shape of the sign, a color of the sign, a visual graphic on the sign. In one embodiment, the robotic vehicle is an aerial vehicle.

In one embodiment, a method for operating a robotic vehicle is provided. The robotic vehicle is moved to a first area. The robotic vehicle is caused to move in a first pattern while located in the first area. A sensor positioned on the robotic vehicle is utilized to identify a first marker positioned in the first area. The robotic vehicle is moved to a second area.

In one embodiment, the robotic vehicle is caused to move in second pattern while located in the second area. In one embodiment, the sensor is utilized to identify a second marker positioned in the second area. The robotic vehicle is caused to move to a third area. In one embodiment, the first marker is a sign and the sensor is a camera. In one embodiment, the first area is mapped and mapping data is stored. In one embodiment, the mapping data is used to navigate in the first area.

In one embodiment, a processor and a memory are provided. The memory comprises executable instructions that when executed by the processor cause the processor to effectuate operations. The operations include: receiving data, from a sensor positioned on a robotic vehicle, descriptive of one or more characteristics of a first marker positioned in a first area within a space defined by a structure; identifying at least one instruction corresponding to the one or more characteristics; and causing the robotic vehicle to perform one or more actions in response to the instruction.

In one embodiment, causing the robotic vehicle to perform one or more actions comprises causing the robotic vehicle to move to a second area within the space. In one embodiment, the operations include receiving data from the sensor descriptive of one or more characteristics of a second marker positioned in a second area within the space. In one embodiment, the operations include causing the robotic vehicle to move to a third area within the space. In one embodiment, the first marker is a sign. In one embodiment, the one or more characteristics include at least one of a size of the sign, a shape of the sign, a color of the sign, a visual graphic on the sign. In one embodiment, the robotic vehicle is an aerial vehicle and the apparatus is positioned thereon.

BRIEF DESCRIPTION OF THE DRAWINGS

A more detailed understanding may be had from the following description, given by way of example in conjunction with the accompanying drawings wherein.

DETAILED DESCRIPTION

Figure 1:
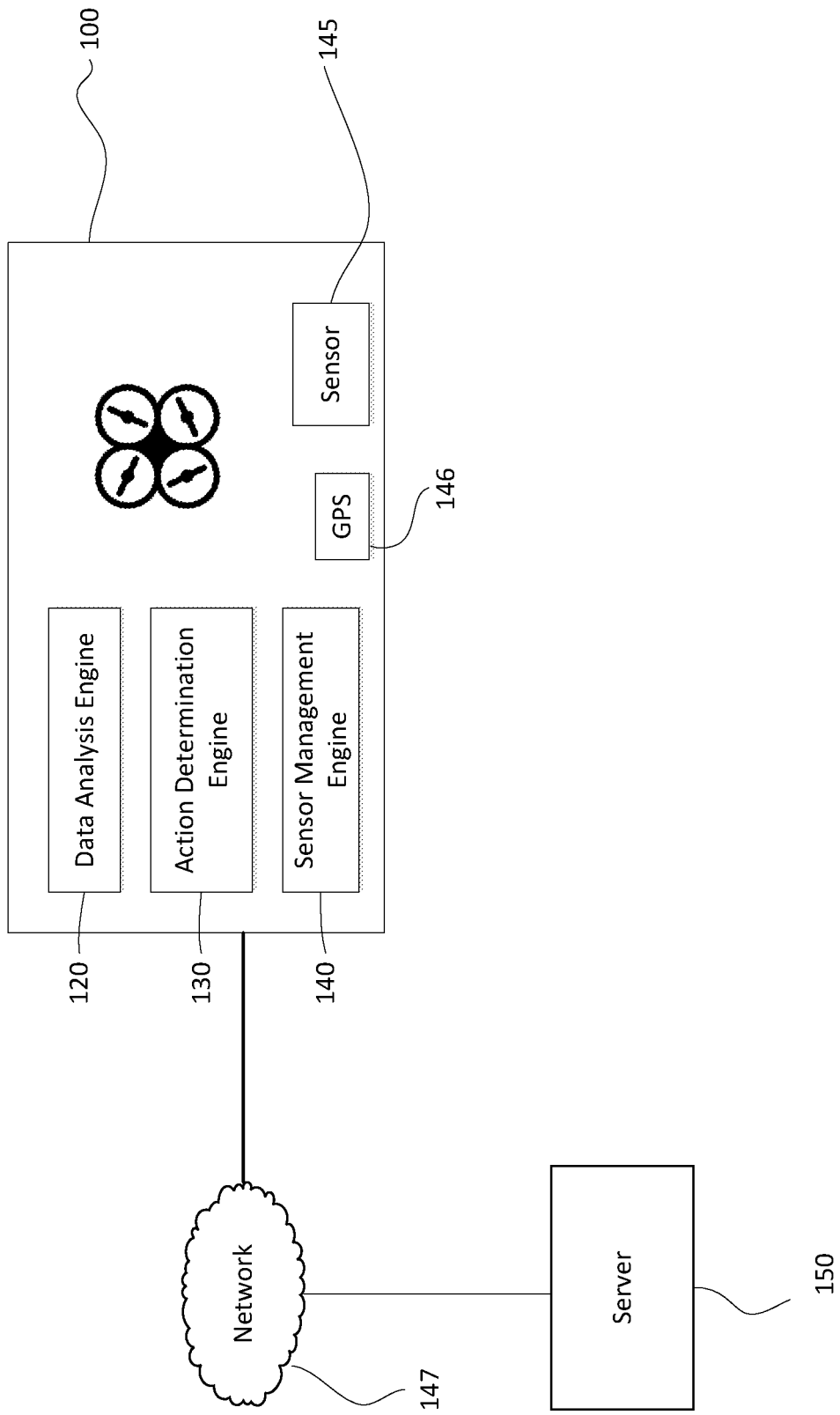
FIG. 1 illustrates an exemplary system associated with a robotic vehicle.

FIG. 1 depicts an exemplary embodiment of a robotic vehicle 100 for illustrative purposes. Robotic vehicle 100 may be terrestrial, aerial, nautical, or multi-mode. In the example shown, robotic vehicle 100 is shown as an aerial vehicle for illustrative purposes.

Robotic vehicle 100 may fly around an area or zone, as well as along routes, and set digital points for navigation or mapping programs. As robotic vehicle 100 moves along a route, it may perform one or more functions or tasks. For instance, robotic vehicle 100 may deliver an item, move an item, and/or retrieve an item. It may generate images of its environment for later analysis. It may perform mapping of its environment, which may be used later for navigation of the same environment. Robotic vehicle 100 may perform cleaning functions. Robotic vehicle 100 may be used to inspect property or an enclosed environment. The preceding use cases have been provided for illustrative purposes and should not be construed as limiting.

Figure 4:
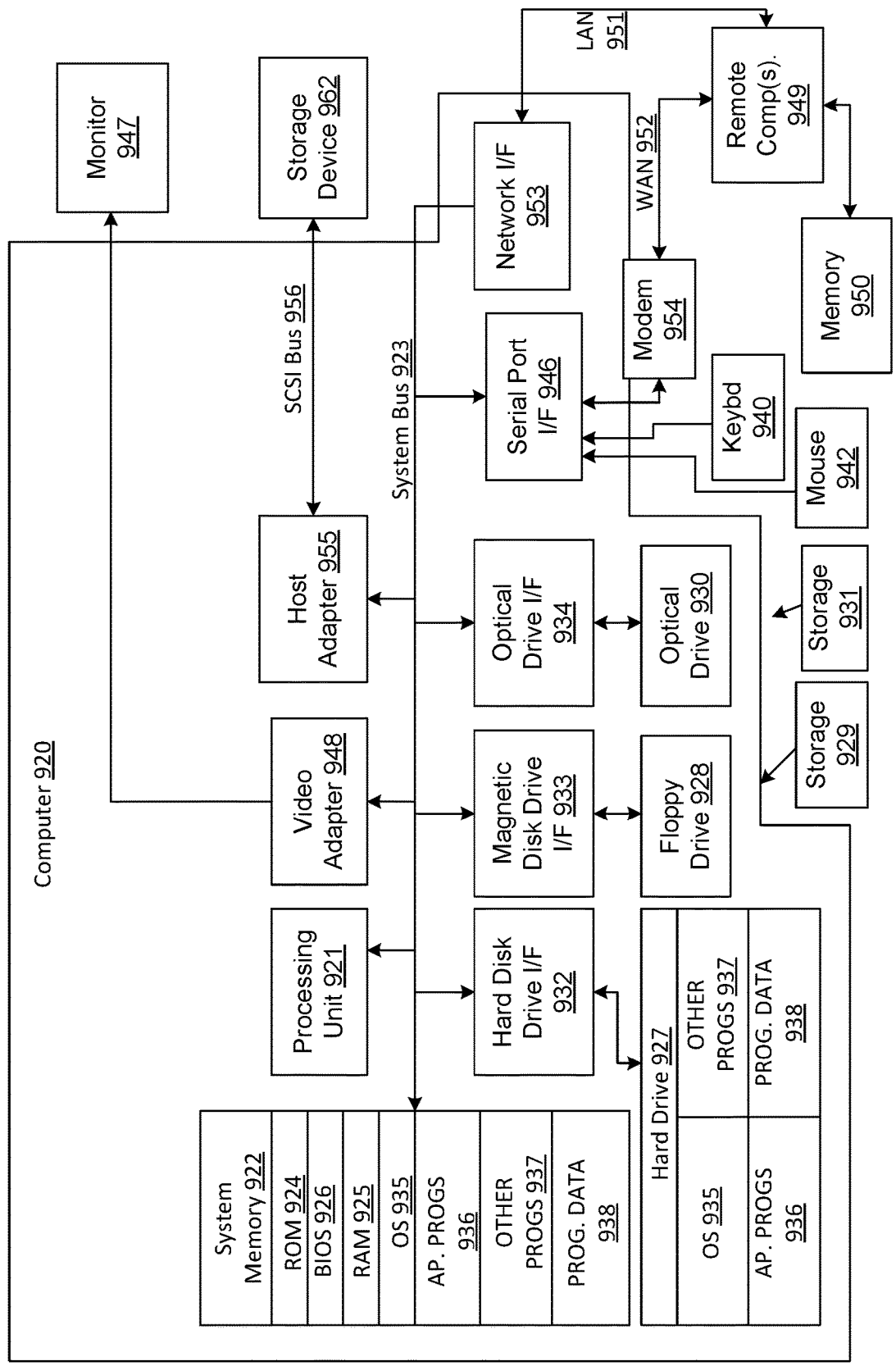
FIG. 4 is an exemplary block diagram representing a computer system in which aspects of the processes and systems disclosed herein or portions thereof may be incorporated.

Robotic vehicle 100 in one example includes, data analysis engine 120, action determination engine 130, and sensor management engine 140, one or more sensors 145, and GPS component 146. Robotic vehicle 100 may be communicatively connected with network 147 and server 150. An entity, such as an individual or a business may own or have control of robotic vehicle 100, network 147, and/or server 150. Robotic vehicle 100 may operate indoors and/or outdoors. Robotic vehicle 100, network 147, and server 150 may reside in the same location or be geographically separated With continued reference to FIG. 1, data analysis engine 120, action determination engine 130, and sensor management engine 140 are logical entities that may be implemented in the form of software (e.g., computer-executable instructions) stored in a memory of, and executing on a processor of robotic vehicle 100, server 150, or another computer system such as illustrated in FIG. 4.

Data analysis engine 120 may analyze data retrieved by sensor 145. Analysis by data analysis engine 120 may include using the data retrieved by sensor 145 to determine a navigation path. In one example, sensor 145 may identify external markers that instruct robotic vehicle 100 to do something, such as move along a navigation path or perform a particular function. Data analysis engine 120 may analyze data received from sensor 145 and convert such data to an instruction. For instance data analysis engine 120 may be programmed to convert data from external markers into one or more instructions. One example would be that data analysis engine 120 was programmed with a table indicating that a particular type of marker corresponded to one or more particular instructions.

Action determination engine 130 in one example receives instructions from data analysis engine 120 and converts the instructions to particular action. For instance, data analysis engine 120 may determine that data received from sensor 145 has indicated that robotic vehicle 100 has reached a first location and therefore robotic vehicle 100 should perform a function. In another example, data analysis engine 120 may determine that data received from sensor 145 has indicated that robotic vehicle 100 has reached a first location and that robotic vehicle should proceed to a second location. Action determination engine 130 receives these instructions and then causes robotic vehicle 100 to execute one or more actions to put the instructions into effect. An example would be if data analysis engine 120 were to receive data from a sensor 145 indicating that robotic vehicle should pick up an item. Data analysis engine 120 would instruct action determination engine 130 to pick up an item. Action determine engine 130 would then plan and execute how robotic vehicle 100 would pick up the item. In another example, data analysis engine 120 may receive data from sensor 145 indicating that robotic vehicle 100 has reached a location of external marker and therefore it should proceed to look for another external marker. Action determination engine 130 would then plan and execute how to locate another marker. For instance, action determination engine may determine that robotic vehicle 100 should traverse an area along a particular pattern and/or path until it locates the next external marker.

Sensor management engine 140 controls sensor 145. This control may include determining which sensor of a plurality of sensors 145 are gathering data/information, the operating characteristics of said data gathering (e.g., the level of zoom of a visible light camera), where sensor 145 is aimed, or any other sensor performance control variables as would be recognized by those skilled in the art. It is contemplated herein that sensor 145 may include a visible light camera, an infrared camera, a microphone, radar emitting/detecting device(s), and/or a navigation sensor, among other things.

Figure 2:
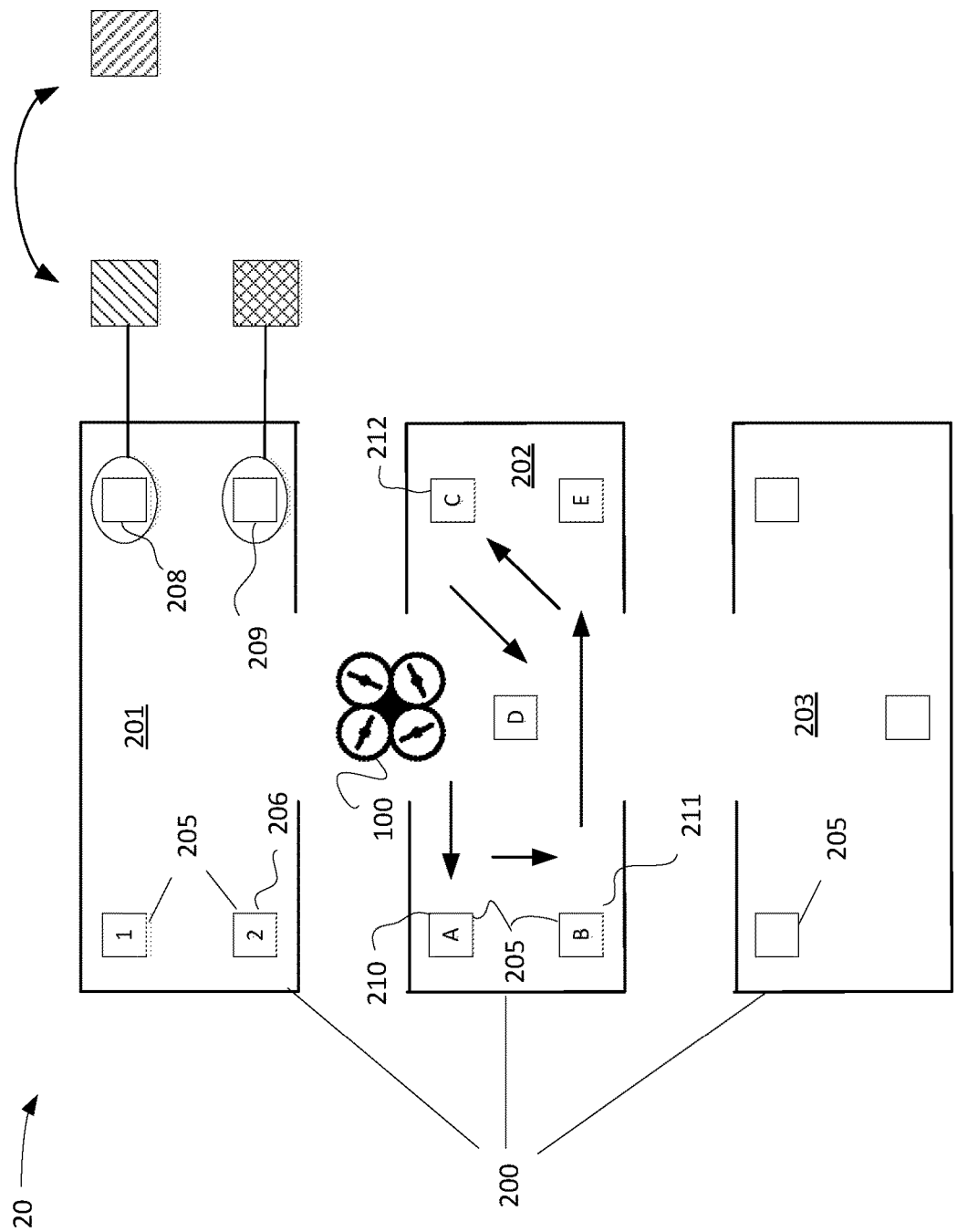
FIG. 2 illustrates an exemplary space within which the robotic vehicle of FIG. 1 may operate.

FIG. 2 illustrates an exemplary environment 20 in which robotic vehicle 100 may operate. Environment 20 may be enclosed or outdoors. Environment 20 may be above ground, below ground, or underwater. As was discussed previously, environment 20 may include one or more zones 200. In the example shown, there are three zones 201, 202, 203, which are provided for illustrative purposes only. It should be recognized that there may be more zones 200 or fewer zones 200 than that which is shown. In addition, a zone 200 may correspond in one example to a room or a certain space. In another example, a certain space may have multiple zones 200. For instance, a warehouse may have multiple zones 200 within the same room.

Within each zone 200 are a plurality of markers 205. Markers 205 provide data that robotic vehicle 100 converts to instructions to cause robotic vehicle 100 to perform one or more actions. In one example, markers 205 may be signs that include visual data. For instance, some markers (e.g. 206) are shown with alphanumeric data. Marker 208 is shown with pattern data of a first type. Marker 209 is shown with pattern data of a second type. In another example, markers 205 may project certain colors. For instance, a first marker may be red; a second maker may be blue; a third marker may be green, and so forth. Sensor 145 may be a device, such as a camera or imaging device that can detect the visual data provided by markers 205.

In another example, markers 205 may be non-visual. For instance, markers may devices that emit various sound waves and sensor 145 may be a microphone that can detect the sound waves. In another example, makers 205 may omit different heat signatures, and sensor 145 may be a thermal detection device that detects the heat signatures. Data analysis engine 120 is programmed such that particular data provided by markers 205 can be translated into an instruction for robotic vehicle 100. It should be noted that markers 205 could be appended to structures or things by a user or markers 205 could be integral to a structure or thing. For instance, a package or thing could be fabricated to include a marker 205. In another example, one or more characteristics of package or thing could be the marker 205.

Referring further to FIG. 2, robotic vehicle 100 may enter zone 202. Upon entering zone 202, sensor 145 may detect marker 210, which has an "A" displayed on it. Data analysis engine 120 may determine that "A" corresponds to a particular instruction. For instance, "A" may mean that robotic vehicle 100 should perform a function, such as performing a task in a warehouse or beginning to vacuum a space for a particular period of time. In another example, "A" may mark a waypoint along a route for robotic vehicle 100. Upon reaching this waypoint, data analysis engine 120 may determine that robotic vehicle 100 should move around until it detects another waypoint. For instance, robotic vehicle 100 may move around until it detects "B" on maker 211, and then "C" on maker 212, and so forth until it traverses the entirety of zone 202. It should be noted that a marker 205 may also instruct robotic vehicle 100 to execute a function, either until a task is completed or for a predetermined time period, and then move in a particular route to locate the next marker 205. As was mentioned earlier, markers may include pattern or color data so a particular color or a pattern may represent a particular instruction. For instance, red may be a waypoint. Upon detecting "red", robotic vehicle may move around until it detects "green". Upon detecting "green", robotic vehicle may move around until it detects "blue", and so forth. In another example, the same process may occur with various patterns on the markers.

Referring further to FIG. 2, one use of pattern data may include changing the orientation of a marker 205 to change the pattern and thereby provide another context in the same location. For example, marker 208 may be rotated, which would change the pattern. This would enable robotic vehicle 100 to receive a first instruction at the location of marker 208. Robotic vehicle 100 may be programmed to perform an action associated with the first instruction at the location of marker 208. Robotic vehicle 100 would then move to another location and receive and instruction from another marker 205. Robotic vehicle 100 may perform the instruction of the other marker 205, and then subsequently move to the location of marker 208 and perform a second instruction related to marker 208, but enabled through the rotation of marker 208 to depict another pattern. In one example, robotic vehicle 100 may actually perform the action of changing the orientation of a marker 205 before moving on to locate another marker 205. In this manner robotic vehicle 100 would be able to program its future actions.

Referring further to FIG. 2, it is possible that in certain use cases, robotic vehicle 100 may enter a location that it is not supposed to enter. An example would be an unmanned aerial vehicle, meant to operate indoors, which accidentally flies out of a window. Robotic vehicle 100 may include countermeasures to prevent such a mishap. For instance, a sensor 145 may be included that detects such a change in environment. Upon detection, the robotic vehicle 100 could reverse course and fly back into the indoor environment. In one example, a GPS device 152 (FIG. 1) may be used to detect that the robotic vehicle 100 is outdoors. Because GPS signals are weaker indoors, a GPS signal would increase in signal strength if robotic vehicle were to exit a structure. Robotic vehicle 100 would detect the increase in signal strength and reverse course to fly back indoors.

Referring further to FIG. 2, it should be noted that robotic vehicle 100 may be performing one or more other functions while traversing a zone 200. For example, robotic vehicle 100 may be vacuuming the floor of a zone 200 as it navigates the zone. In another example, robotic vehicle may be mapping the zone 200. This mapping data could then be used by robotic vehicle 100 to navigate the zone 200 in the future. This would allow a user to train robotic vehicle 100 in how to traverse a space in a manner that the user preferred.

Figure 3:
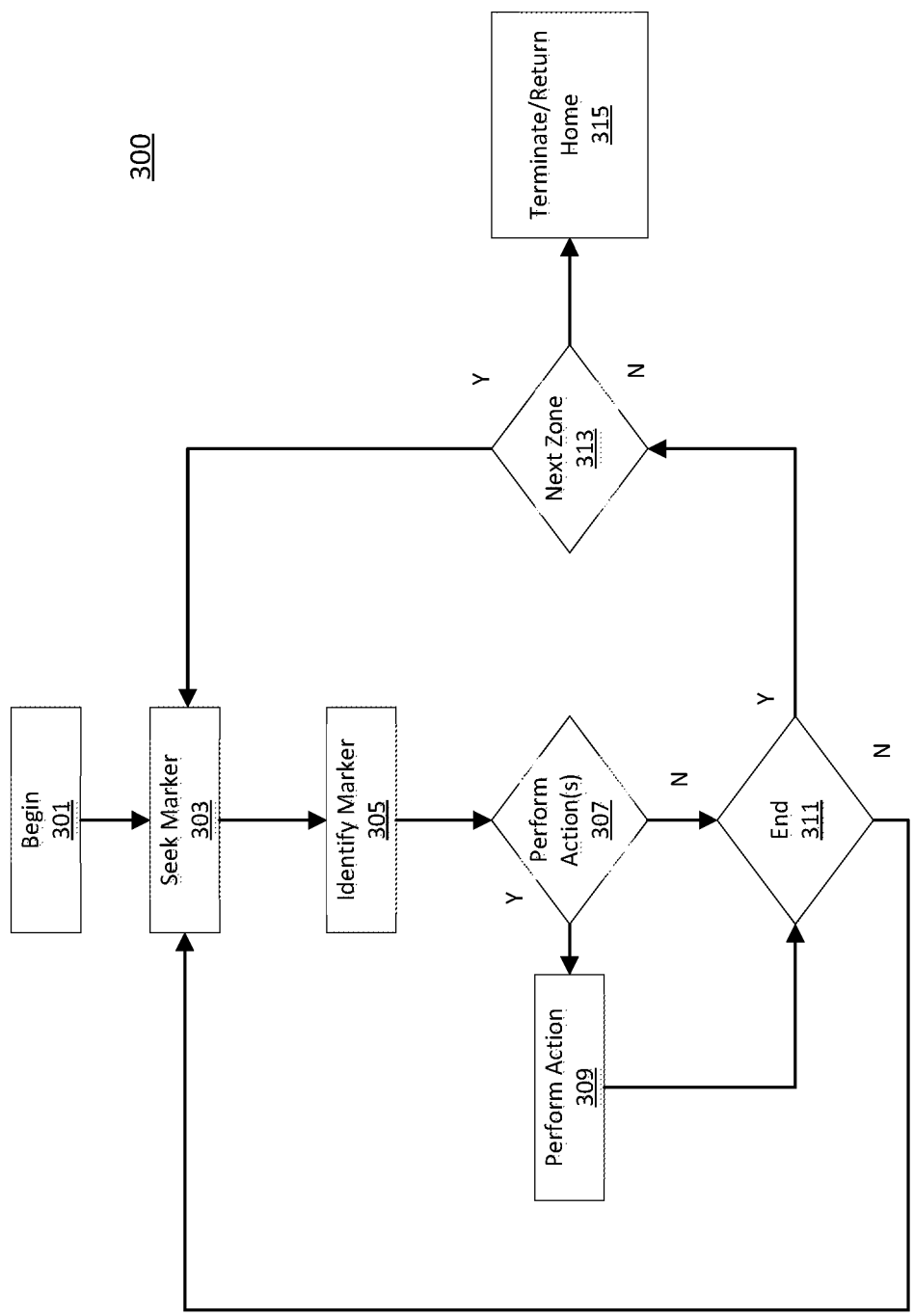
FIG. 3 illustrates an exemplary process for operating the robotic vehicle of FIG. 1.

Referring to FIG. 3, an exemplary process 300 of operating robotic vehicle 100 will now be provided for illustrative purposes.

In step 301, the process 300 begins. In one example, step 301 may correspond to the robotic vehicle 100 powering on or the actuation of a start command by the user. In step 303, robotic vehicle 100 seeks a marker 205, which may be the first marker in a particular zone 205 or the first marker 205 in an enclosure or space. In one example, seeking a marker 205 may involve using sensor 145 to detect one or more characteristics of the marker 205. For instance, if sensor 145 were an optical sensor, it may attempt to detect a color, a shape, and/or a pattern of maker 205. One example would be to identify a "red" marker. Another example, would be identify a "red" and "square" marker. Another example would be to identify, a "red" and "square" marker with a particular pattern or picture placed upon it. In another instance, sensor 145 may be an audio sensor. In such an example, robotic vehicle 100 may operate in a zone 200 and attempt to locate an audio signal having one or more signature characteristics. In another example sensor 145 may be a thermal imaging device and robotic vehicle 100 would operate to locate markers having certain heat signatures.

Referring further to FIG. 3, upon identification of a marker in step 305, the method 100 would proceed to step 307, in which robotic vehicle 100 would determine whether or not there were one or more actions associated with the marker 205 that robotic vehicle 100 needed to perform. If there were action(s) to perform, then in step 309, the action(s) would be performed as described above. An action may include performing one or more functions or it may involve leaving a zone 200 and commencing to look for another marker. Once all action(s) are performed, the process 300 would pass to step 311.

If there were no action(s) to perform, then the process 300 would also pass to step 311. In step 311, a determination would be made as to whether robotic vehicle 100 had completed locating all of the markers 205 that it was programmed to identify in a zone 200 and/or enclosure or space. If the answer were "no", then robotic vehicle 100 would seek the next marker 205 in step 303. If the answer were "yes", then robotic vehicle 100, in step 313, would determine if it should move to another zone 200, enclosure, and/or space. If the answer were "yes", then robotic vehicle 100 would begin a routine of looking for the marker in the next zone 200, enclosure, or space in step 303. In another example, robotic vehicle 100 may be programmed or obtain mapping data such that it knows the location of various rooms and spaces an proceeds to those spaces in a certain sequence and commences to seek markers 205 therein.

Referring further to FIG. 3, if the answer were "no", in step 313, then the robotic vehicle 100 would terminate the process 300. Terminating the process 300 in one example may be to remain solitary, sound an alarm, and/or power off. In another example, robotic vehicle 100 may be programmed to return to a home base. A home base in one example may be indicated by another marker 205 in which case robotic vehicle 100 would seek the marker 205 in the manner described above. In another example, robotic vehicle 100 may be programmed with the location of the home base or be guided to the home base through other means.

FIG. 4 and the following discussion are intended to provide a brief general description of a suitable computing environment in which the methods and systems disclosed herein or portions thereof may be implemented. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips or multiple electrical components with different architectures. The methods and systems disclosed herein may also be practiced in distributed computing environments where tasks are performed by remote processing devices that are linked through a communications network.

In a distributed computing environment, program modules may be located in both local and remote memory storage devices.

FIG. 4 is a block diagram representing a general purpose computer system in which aspects of the methods and systems disclosed herein and/or portions thereof may be incorporated. As shown, the exemplary general purpose computing system includes a computer 920 or the like, including a processing unit 921, a system memory 922, and a system bus 923 that couples various system components including the system memory to the processing unit 921. The system bus 923 may be any of several types of bus structures including a memory bus or memory controller, a peripheral bus, and a local bus using any of a variety of bus architectures. The system memory includes read-only memory (ROM) 924 and random access memory (RAM) 925. A basic input/output system 926 (BIOS), containing the basic routines that help to transfer information between elements within the computer 920, such as during start-up, is stored in ROM 924.

The computer 920 may further include a hard disk drive 927 for reading from and writing to a hard disk (not shown), a magnetic disk drive 928 for reading from or writing to a removable magnetic disk 929, and an optical disk drive 930 for reading from or writing to a removable optical disk 931 such as a CD-ROM or other optical media. The hard disk drive 927, magnetic disk drive 928, and optical disk drive 930 are connected to the system bus 923 by a hard disk drive interface 932, a magnetic disk drive interface 933, and an optical drive interface 934, respectively. The drives and their associated computer-readable media provide non-volatile storage of computer readable instructions, data structures, program modules and other data for the computer 920. As described herein, computer-readable media is a tangible, physical, and concrete article of manufacture and thus not a signal per se.

Although the exemplary environment described herein employs a hard disk, a removable magnetic disk 929, and a removable optical disk 931, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 929, optical disk 931, ROM 924 or RAM 925, including an operating system 935, one or more application programs 936, other program modules 937 and program data 938. A user may enter commands and information into the computer 920 through input devices such as a keyboard 940 and pointing device 942. Other input devices (not shown) may include a microphone, joystick, game pad, satellite disk, scanner, or the like. These and other input devices are often connected to the processing unit 921 through a serial port interface 946 that is coupled to the system bus, but may be connected by other interfaces, such as a parallel port, game port, or universal serial bus (USB). A monitor 947 or other type of display device is also connected to the system bus 923 via an interface, such as a video adapter 948. In addition to the monitor 947, a computer may include other peripheral output devices (not shown), such as speakers and printers. The exemplary system of FIG. 4 also includes a host adapter 955, a Small Computer System Interface (SCSI) bus 956, and an external storage device 962 connected to the SCSI bus 956.

The computer 920 may operate in a networked environment using logical connections to one or more remote computers, such as a remote computer 949. The remote computer 949 may be a personal computer, a server, a router, a network PC, a peer device or other common network node, and may include many or all of the elements described above relative to the computer 920, although only a memory storage device 950 has been illustrated in FIG. 4. The logical connections depicted in FIG. 4 include a local area network (LAN) 951 and a wide area network (WAN) 952. Such networking environments are commonplace in offices, enterprise-wide computer networks, intranets, and the Internet.

When used in a LAN networking environment, the computer 920 is connected to the LAN 951 through a network interface or adapter 953. When used in a WAN networking environment, the computer 920 may include a modem 954 or other means for establishing communications over the wide area network 952, such as the Internet. The modem 954, which may be internal or external, is connected to the system bus 923 via the serial port interface 946. In a networked environment, program modules depicted relative to the computer 920, or portions thereof, may be stored in the remote memory storage device. It will be appreciated that the network connections shown are exemplary and other means of establishing a communications link between the computers may be used.

Computer 920 may include a variety of computer readable storage media. Computer readable storage media can be any available media that can be accessed by computer 920 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 920. Combinations of any of the above should also be included within the scope of computer readable media that may be used to store source code for implementing the methods and systems described herein. Any combination of the features or elements disclosed herein may be used in one or more examples.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for operating a robotic vehicle comprising:
utilizing a sensor positioned on the robotic vehicle to identify a first marker positioned in a first area within a space defined by a structure;
receiving data from the sensor descriptive of one or more characteristics of the first marker;
identifying a first instruction corresponding to the one or more characteristics; and
causing the robotic vehicle to change a physical orientation characteristic of the first marker and move to a second area within the space.

2. The method of claim 1, further comprising utilizing the sensor to identify a second marker positioned in a second area within the space.

3. The method of claim 2, further comprising causing the robotic vehicle to move to the first area within the space.

4. The method of claim 3, further comprising:
utilizing the sensor to identify the first marker; and
identifying a second instruction corresponding to the physical orientation characteristic change, wherein the second instruction is different from the first instruction.

5. The method of claim 1, wherein the first marker is a sign.

6. The method of claim 5, wherein the one or more characteristics include at least one of a size of the sign, a shape of the sign, a color of the sign, a visual graphic on the sign.

7. The method of claim 1, wherein the robotic vehicle is an aerial vehicle.

8. A method for operating a robotic vehicle comprising:
moving the robotic vehicle to a first area;
moving the robotic vehicle in a first pattern in the first area;
utilizing a sensor positioned on the robotic vehicle to identify a first marker positioned in the first area;
changing the first marker by causing the robotic vehicle to change a physical orientation characteristic of the first marker; and
moving the robotic vehicle to a second area.

9. The method of claim 8, further comprising:
causing the robotic vehicle to move in second pattern while located in the second area.

10. The method of claim 9, further comprising:
utilizing the sensor to identify a second marker positioned in the second area; and
causing the robotic vehicle to move into the first area.

11. The method of claim 10, further comprising:
causing the robotic vehicle to perform one or more actions in response to the physical orientation change of the first marker.

12. The method of claim 8, wherein the first marker is a sign and the sensor is a camera.

13. The method of claim 8, further comprising:
mapping the first area while moving in the first pattern; and
storing mapping data of the first area.

14. The method of claim 13, further comprising:
using the mapping data to navigate in the first area.

15. An apparatus comprising:
a processor; and
a memory coupled with the processor, the memory comprising executable instructions that when executed by the processor cause the processor to effectuate operations comprising:
receiving data, from a sensor positioned on a robotic vehicle, descriptive of one or more characteristics of a first marker positioned in a first area within a space defined by a structure;
identifying a first instruction corresponding to the one or more characteristics; and
causing the robotic vehicle to perform one or more actions in response to the first instruction, wherein the one or more actions comprise changing a physical orientation characteristic of the first marker and moving the robotic vehicle to a second area within the space.

16. The apparatus of claim 15, wherein the operations further comprise:
receiving data from the sensor descriptive of one or more characteristics of a second marker positioned in a second area within the space.

17. The apparatus of claim 16, wherein the operations further comprise:
causing the robotic vehicle to move to the first area within the space.

18. The apparatus of claim 17, wherein operations further comprise:
utilizing the sensor to identify the first marker; and
identifying a second instruction corresponding to the physical orientation characteristic change, wherein the second instruction is different from the first instruction.

19. The apparatus of claim 15, wherein the first marker is a sign.

20. The apparatus of claim 19, wherein the one or more characteristics include at least one of a size of the sign, a shape of the sign, a color of the sign, a visual graphic on the sign.

21. The apparatus of claim 20, wherein the robotic vehicle is an aerial vehicle and the apparatus is positioned thereon.

* * * * *